Figure 1:
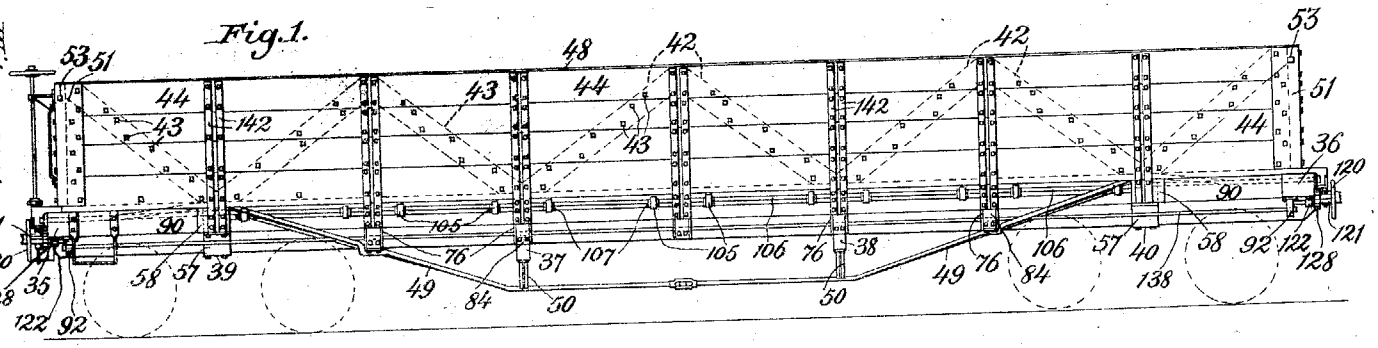

No. 12,447. REISSUED FEB. 6, 1906.

W. A. CASWELL.

CAR.

APPLICATION FILED JAN. 5, 1906. 6 SHEETS—SHEET 1.

Witnesses:
Charles F. Fitts
Chas. H. Burell

Inventor:
William A. Caswell,
By Thomas F. Sheridan,
Atty.

No. 12,447.
REISSUED FEB. 6, 1906.
W. A. CASWELL.
CAR.
APPLICATION FILED JAN. 5, 1906.
6 SHEETS—SHEET 2.
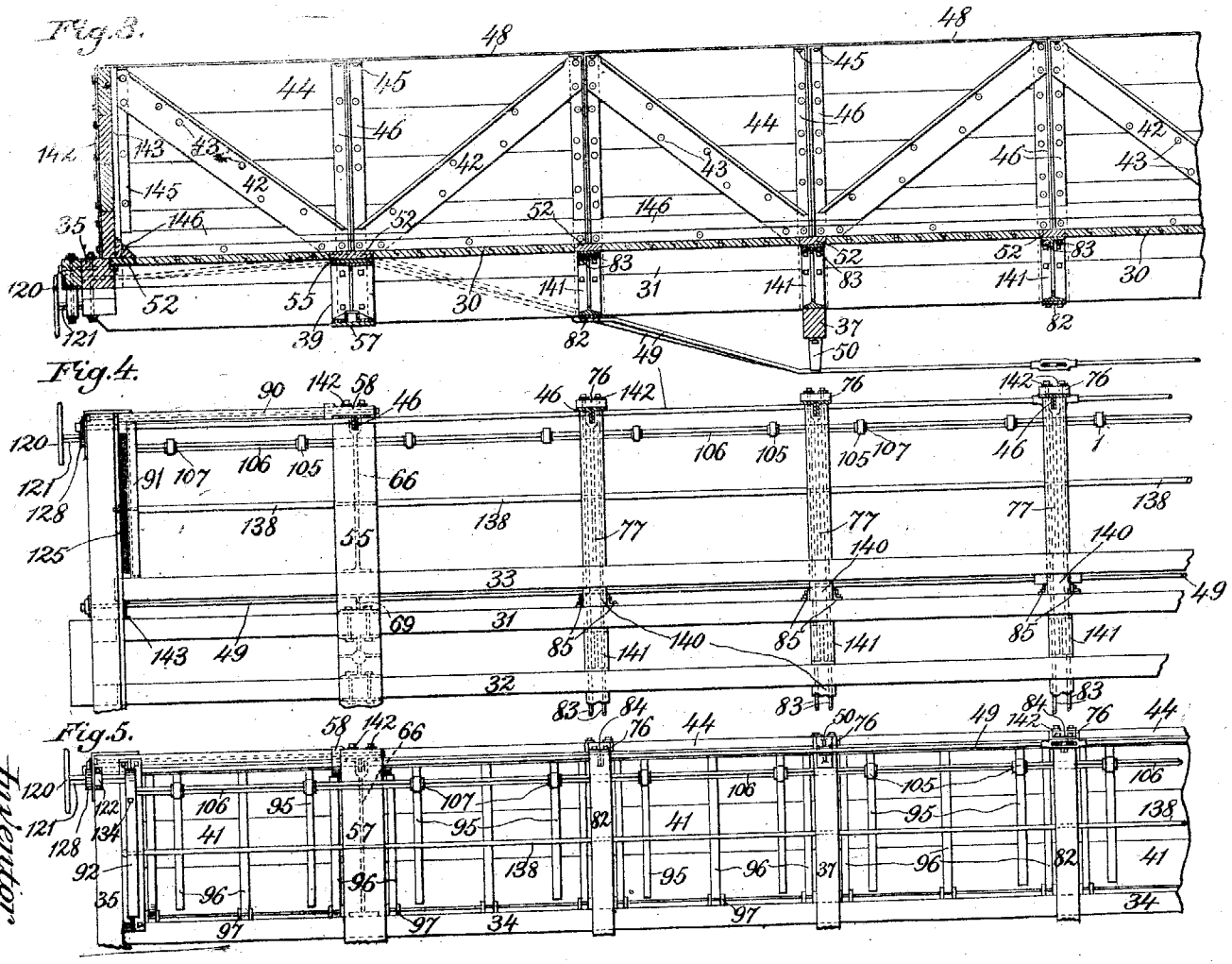
Witnesses:
Charles F. Hitt.
Geo. H. Buell.
Inventor
William A. Caswell,
By Thomas F. Sheridan,
Att'y.

No. 12,447.

REISSUED FEB. 6, 1906

W. A. CASWELL.

CAR.

APPLICATION FILED JAN. 5, 1906.

6 SHEETS—SHEET 3.

Witnesses:

Charles F. Fitts

Chas. N. Bull

Inventor:

William A. Caswell,

By Thomas F. Sheridan,

Att'y.

No. 12,447. REISSUED FEB. 6, 1906.

W. A. CASWELL.

CAR.

APPLICATION FILED JAN. 5, 1906. 6 SHEETS—SHEET 4.

Witnesses:

Charles F. Fritz

Chas. H. Buell

Inventor:

William A. Caswell, by Thomas F. Sheridan,

Atty.

No. 12,447. REISSUED FEB. 6, 1906.

W. A. CASWELL.

CAR.

APPLICATION FILED JAN. 5, 1906.

6 SHEETS—SHEET 5.

Witnesses:

Charles F. Fitts.

Chas. H. Buell.

Inventor:

William A. Caswell,

By Thomas F. Sheridan,

Atty.

No. 12,447. REISSUED FEB. 6, 1906.

W. A. CASWELL.

CAR.

APPLICATION FILED JAN. 5, 1906.

6 SHEETS—SHEET 6.

Witnesses:

Charles F. Fitts

Chas. H. Buell.

Inventor:

William A. Caswell,

By Thomas F. Sheridan,

Atty.

UNITED STATES PATENT OFFICE.

WILLIAM A. CASWELL, OF CHICAGO, ILLINOIS, ASSIGNOR, BY MESNE ASSIGNMENTS, TO NATIONAL COAL DUMP CAR COMPANY, OF CHICAGO, ILLINOIS, A CORPORATION OF SOUTH DAKOTA.

CAR.

No. 12,447. Specification of Reissued Letters Patent. Reissued Feb. 6, 1906.

Original No. 806,394, dated December 5, 1905. Application for reissue filed January 5, 1906. Serial No. 294,799.

*To all whom it may concern:*

Be it known that I, WILLIAM A. CASWELL, a citizen of the United States, residing in Chicago, in the county of Cook and State of Illinois, have invented a certain new and useful Improvement in Cars, of which the following is a specification.

This invention relates to that class of freight-cars having a level floor adapted to the carrying of any class of freight and provided with trap-doors adapted to be opened to dump the loads when they consist of sand, gravel, coal, or grain, the car being also adapted to be unloaded by shoveling. A type of such cars is shown in my Patent No. 619,670.

The main feature of the present invention is the dispensing with the side sills heretofore used in all cars of which I have any knowledge. The omitting of the side sills enables me to obtain an opening along the sides of the car-floor and outside the track sufficiently large to permit the discharge of large lumps of coal without hindrance, so that all the coal can be dumped outside the track into a chute or onto a sizing-grate and where even if it is not immediately removed it will not interfere with the movement of the car. This feature is of great importance, especially in coal-cars. The trap-doors employed are arranged in two series, one along each side of the car, and are hinged at their inner edges and are provided with novel means for supporting and operating them, and when opened they deflect the coal beyond the track, so that the latter remains unobstructed. All these and other features, as well as the details of my construction, are fully set forth below and also illustrated in the accompanying drawings, in which latter—

Figure 2:
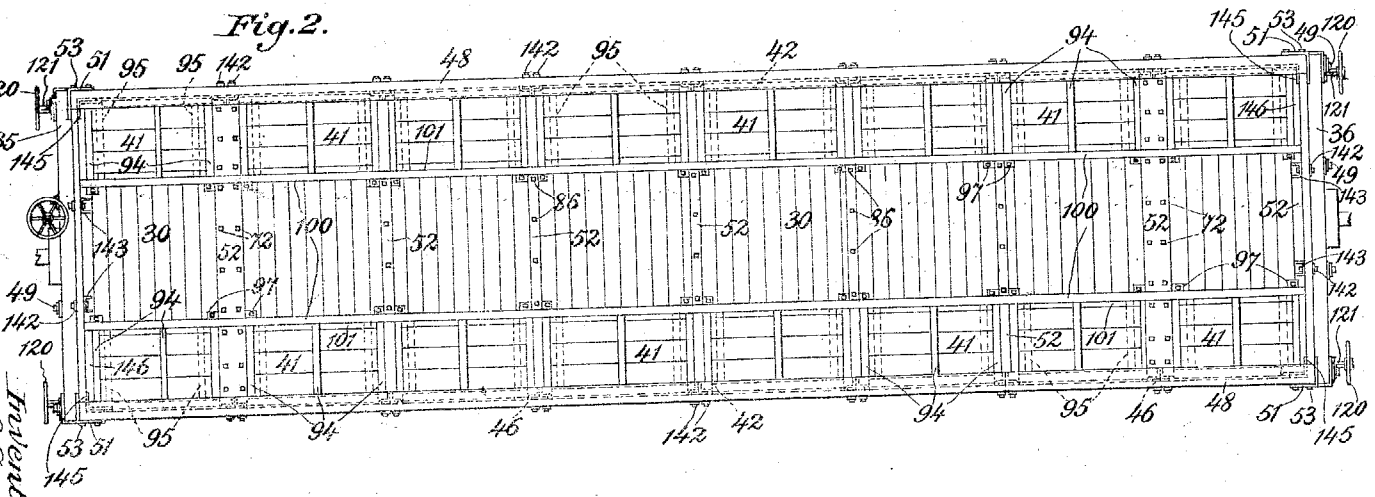
Figure 6:
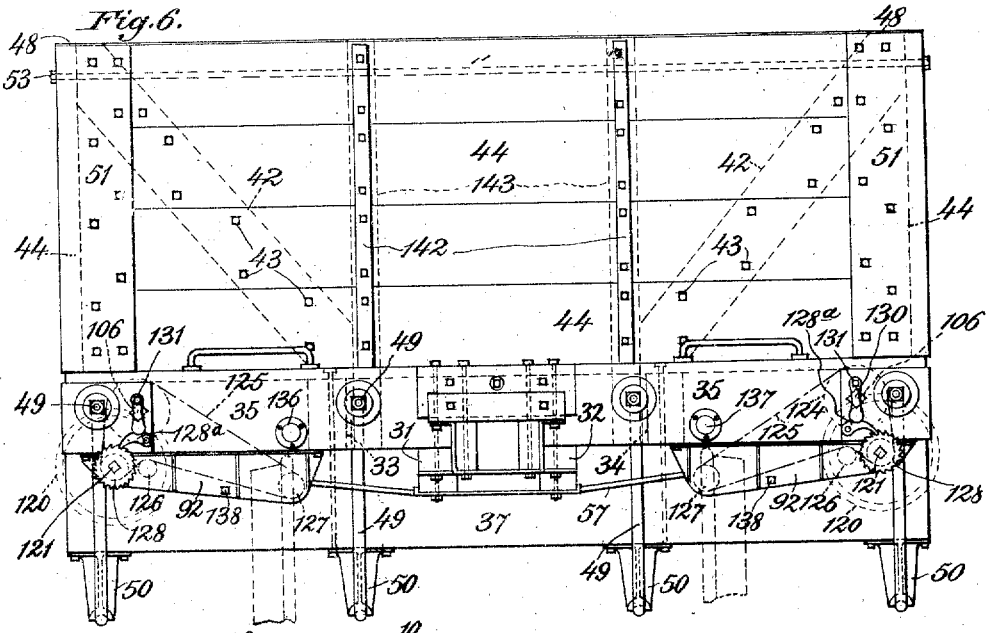
Figure 7:
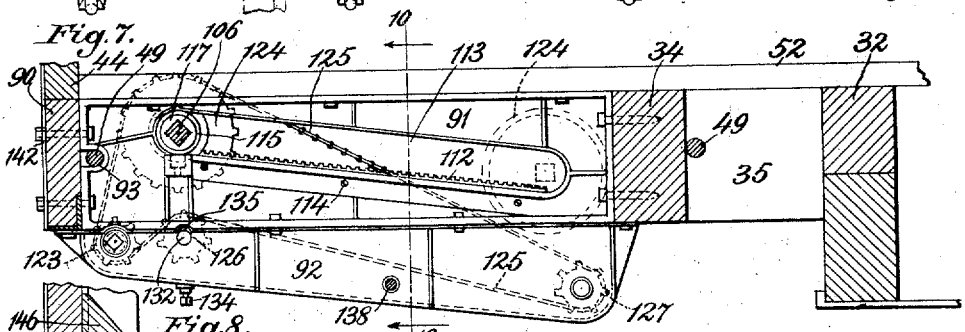
Figure 8:
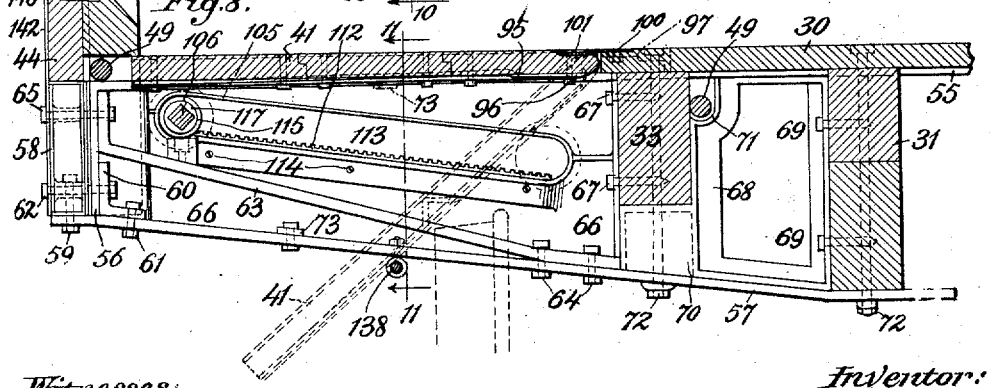
Figure 9:
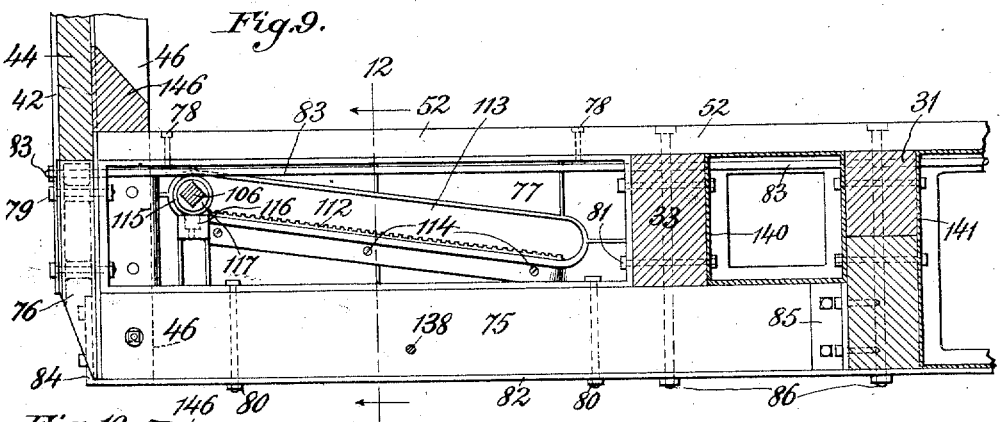
Figure 10:
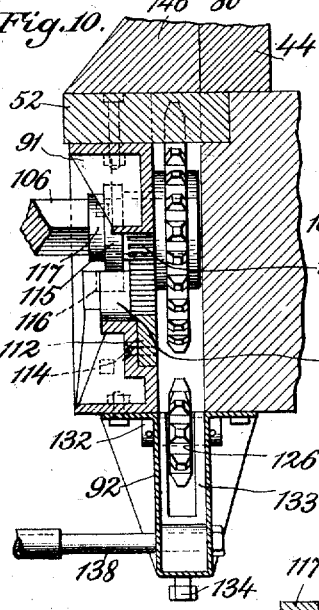
Figure 11:
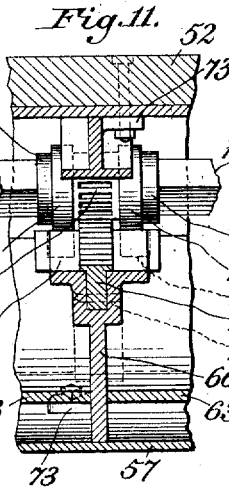
Figure 12:
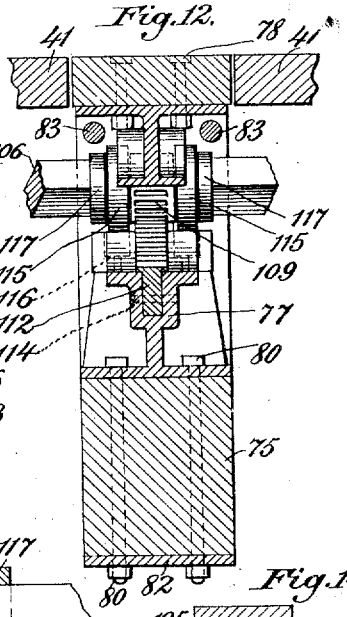
Figure 13:
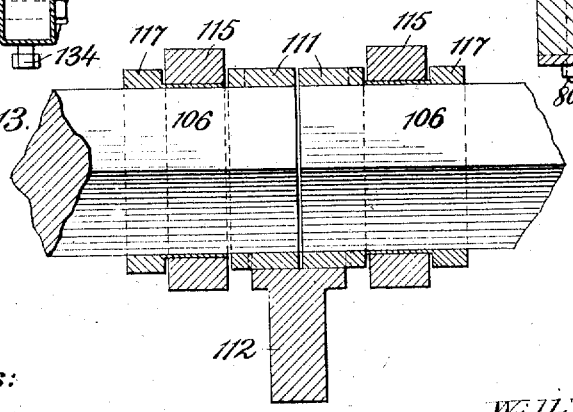
Figure 14:
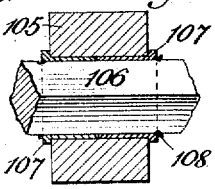
Figure 15:
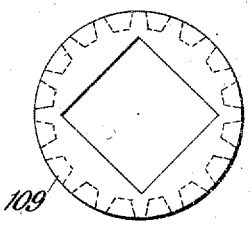
Figure 16:
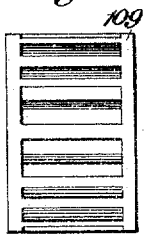
Figure 17:
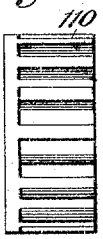
Figure 18:
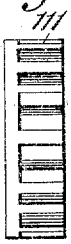
Figure 19:
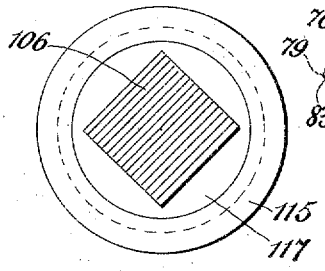
Figure 20:
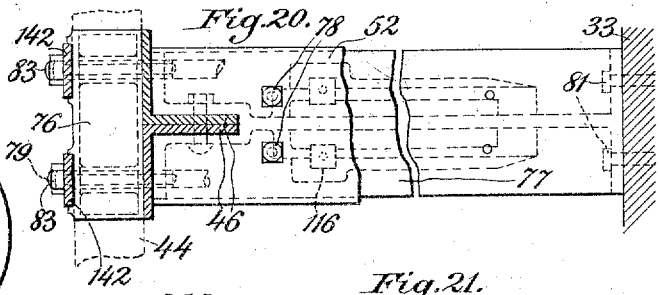
Figure 21:
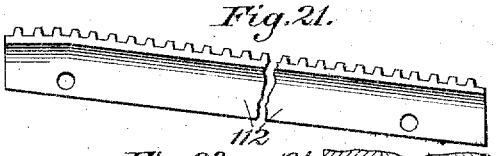
Figure 22:
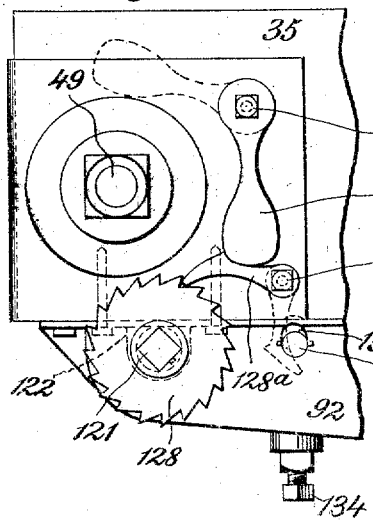
Figure 23:
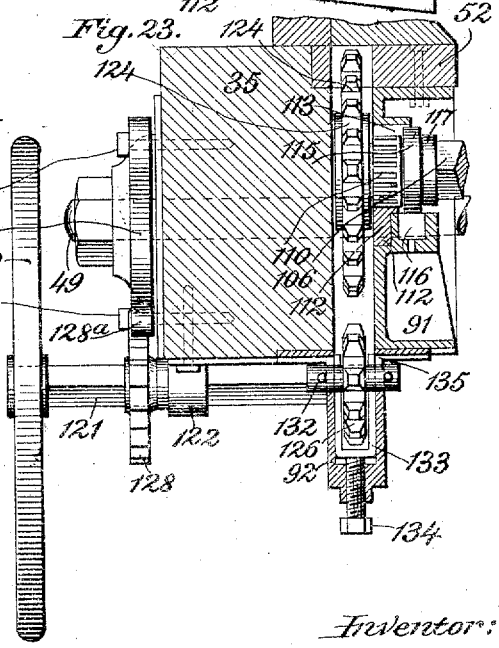
Figure 24:
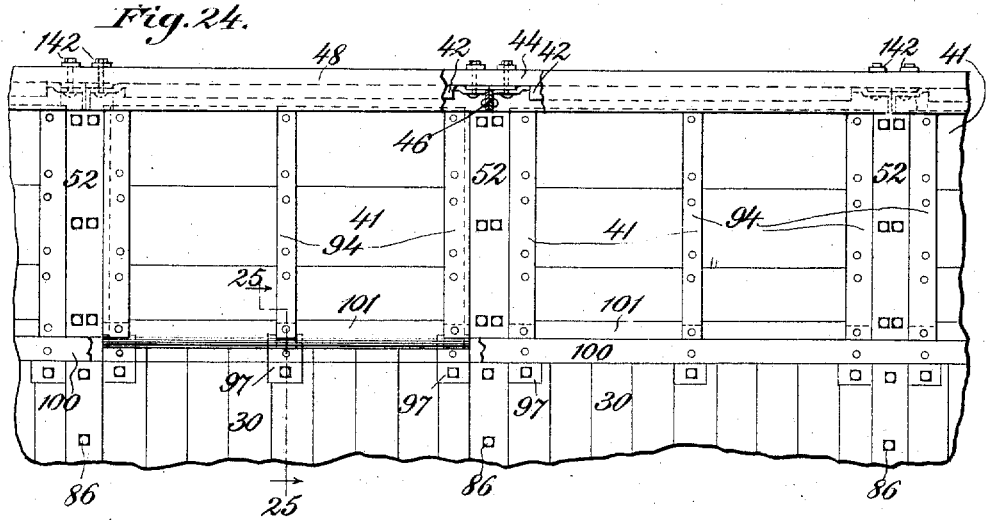
Figure 25:
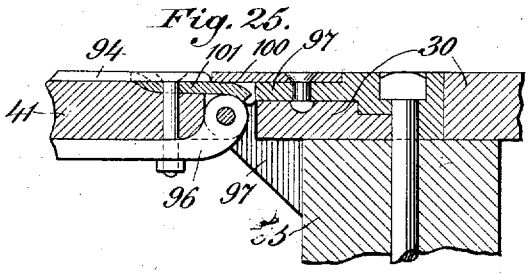
Figure 26:
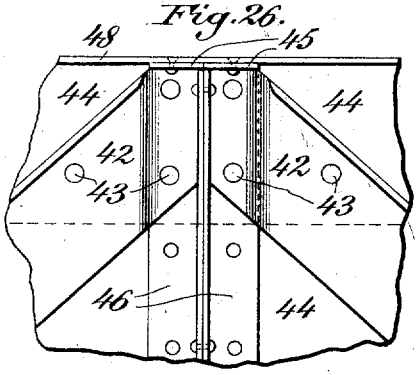

Figure 1 is a side elevation, and Fig. 2 a plan, of the invention. Fig. 3 is a partial longitudinal vertical section; Fig. 4, a partial plan of the underframing. Fig. 5 is a partial bottom plan. Fig. 6 is an end elevation. Figs. 7, 8, and 9 are partial transverse sections on different planes. Fig. 10 is a section on line 10 10 of Fig. 7. Fig. 11 is a section on line 11 11 of Fig. 8. Fig. 12 is a section on line 12 12 of Fig. 9. Fig. 13 is a partial longitudinal section of the roller-shafts supporting the doors, showing the abutting ends of the alined shafts on one side of the car. Fig. 14 is a similar section of one of the shafts, showing one of the door-supporting rollers. Fig. 15 is a side elevation of one of the rimmed pinions upon the roller-shaft. Figs. 16, 17, and 18 are front elevations of said gears. Fig. 19 is a side view of one of the door-supporting rollers. Fig. 20 is a partial horizontal section. Fig. 21 is a detached view of one of the racks of the door mechanism. Fig. 22 is an end elevation with the hand or crank wheel omitted. Fig. 23 is a longitudinal section of the operating devices of the door mechanism. Fig. 24 is an enlarged plan of the dump-doors, partly broken away at two points. Fig. 25 is a detail section of the door and hinge on the line 25 25 of Fig. 24, and Fig. 26 is a partial inside elevation showing the joint between the side braces and the stakes.

In said drawings like figures of reference indicate like parts.

In said drawings, 30 represents the floor of my improved car, and in the underframing thereof there is a pair of center sills 31 and 32, intermediate sills 33 and 34, and sills 35 and 36, transverse or needle beams 37 and 38, and bolsters 39 and 40. The intermediate sills are at some distance from the side of the car, and as the ordinary side sill is dispensed with it will be seen that opportunity is thereby gained between the intermediate sills and the sides of the car for the wide doorways needed for large coal. The trap or dump doors, of which there is a series on each side of the car, are shown at 41, and they are hinged at their inner edges, so their outer edges may swing downward, and they are otherwise constructed and operated as hereinafter fully set forth.

The doors form a large part of the floor area, and its outer side portions and cross-frame members are placed between each pair of them, so that they may be supported in their closed positions from the adjacent members of the cross-framing instead of the longitudinal sills, as is the customary construction. The walls of the superstructure or box of the car are greatly strengthened over previous constructions, so that they are adapted to assist materially in supporting the weight of the load. The walls consist of heavy plank 44, (though sheet-steel may be used in place of the plank,) and they are braced by diagonal braces 42 and bolted to the wallplanks by bolts 43. These braces are not mere tying devices, but, on the contrary, are made large enough so that in addition to that function they also serve efficiently in stiffening the walls and enabling them to resist the tendency to sag under the load. They project into the car, and consequently the load will lodge upon and be supported by them to a very considerable extent, and to the extent that the load does thus lodge upon them the doors are relieved. They are stayed at their upper ends by the bent-over web 45 of the angle-irons 46, forming the stakes of the superstructure, (see Fig. 26,) and at the bottom they rest upon or are attached to the cross members of the car-frame, which are more particularly described below. Each brace extends from a stake to the adjacent cross member much as in bridge and other trussed work. I aim by this feature to increase rather than diminish the tendency of the load to arch or dome, because the weight upon the doors is thereby reduced, and they are consequently more easily opened.

The bulging of the sides under the pressure of the load is prevented by providing each of the sides with a wide strong top plate 48, continuous from end to end of the car and secured to the bent-over webs 45 of the stakes by riveting. The stakes themselves are also rendered very firm against the outward pressure of the load by extending them down to the bottom of the bolsters and headers and arranging them between the exterior castings 58 and 76 and the webbed castings, hereinafter mentioned, to both of which they are firmly bolted. A series of truss-rods 49 extend from one end sill to the other, passing over the bolsters and under the queen-posts 50, which depend from the needle-beams. The ends and sides of the box or superstructure are secured together at the corners by wide angle-bars 51, applied to the outside, and a tie-rod 53 is passed from side to side of the car at each end. The floor of the car consists in the main of short pieces extending from the doors on one side to the doors upon the other side; but over each cross-frame member between the end sills a piece of flooring 52, extending from side to side of the car, is employed.

Of the underframing the center, intermediate, and end sills are of the usual construction; but the bolsters and other cross-frame members are novel in their design. The bolsters are clearly shown at Figs. 8 and 11, and they are provided with a strong metal strap 55, extending from side to side of the car above the sills and immediately below the floor and having its ends bent downward, as seen at 56. They are also provided with a bottom strap or flat bar 57, likewise extending from side to side and under the sills. Below the side planking on each side of the car is a hollow casting 58, filling the space outside the bent ends 56 and under the planking, and the strap 57 is secured to it, as seen at 59. An angle-piece 60 is also employed at the junction of the bent end 56 with strap 57, and it is bolted to both of them by bolts 61 and 62, the latter passing through the casting 58 also. Duplicate braces 63 connect the end 56 with the central portion or strap 57 at each side of the web casting or plate 66 and are bolted to said straps by bolts 64 and 65, of which the former passes through casting 58. A web casting or plate 66 fills the space between the straps 55 and 57 and the end 56 and the intermediate sill and is provided with flanges at its inner end whereby it may be bolted to said sill, as seen at 67. The casting is forked at its outer end to enable it to partially surround the adjacent side stake and with laterally-projecting lips 73, which are bolted to the straps 55 and 57. The straps 55 are also forked to enable them to set around the stakes. A hollow shell-casting 68 is placed between the intermediate and center sills and bolted to the latter by bolts 69. This casting is also provided with a wing 70, filling the open space between the intermediate sill and the strap 57, and with a shoulder 71 to support the center truss-rod 49. Vertical bolts 72 extend through the floor, the sills, and the strap 57, as shown, one of them also passing through the wing 70. These features render the bolster unusually strong and amply able to sustain ordinary loads. The outer truss-rod is passed over the strap 55 and through an opening in the side stake, as seen at Fig. 8.

The header (shown more particularly at Figs. 9 and 12) embodies a beam 75, extending outward from the center sill and supporting the intermediate sill, an outer shell-casting 76, below the outside planking, and a metal frame 77, filling the space between the floor, the beam 75, the casting 76, and the intermediate sill. This frame has a central web, so that it is very strong, and it is bolted to the floor by bolts 78, to the casting 76 by bolts 79, to beam 75 by bolts 80, and to the intermediate sill by bolts 81. Its outer end is forked in the same manner as the web casting 66 and as shown at Fig. 20 to enable it to span the side stake located at such end. A metal strap 82 extends from side to side of the car below beam 75 and the center sill and its ends are bent up, as at 84, into and bolted to the hollow of casting 76. Strong tie-rods 83 are passed through the car at each side of the web of frame 77, as plainly shown. The beam 75 is attached to the center sill by vertical angle-irons 85, bolted to both of them, as seen at Fig. 9. The vertical bolts 86 unite the beam 75 and strap 82 to the sills, as shown.

Arranged parallel and in proximity to each end sill and extending from each intermediate sill outward to a block 90, arranged below and in the plane of the planking 44, is another webbed frame-casting 91, bolted to the floor, said block, and the intermediate sill. Below the casting 91 is a shell 92 of about the same length as the casting and intended to give support to some of the movable parts of the door mechanism, as hereinafter set forth. The shell is arranged partly under the casting and partly under the end sill, and it is bolted to both of them. The casting 91 has a recess 93 formed in its outer end to give room to one of the main truss-rods 49. The block 90 extends from the end sill to the bolster and greatly strengthens the latter.

The doors 41 have top metal plates 94 extending transversely of them at their ends and center and bottom bearing plates or strips 95 where they come in contact with the supporting-rollers, described later on. Their inner edges are hinged to the floor of the car at each end and at their longitudinal centers by hinges, each consisting of the straps 96, carrying the pintle and attached to the under side of the door, and the eye-carrying plate 97, which is let into the edge of the floor. The strap 96 is bent upward and let into the under surface of the door, as shown, in order that it may not limit the extent to which the door may be operated by its contact with other parts.

The joint at the hinged side of the door is so constructed that it is at all times proof against the entrance into it of grain, coal, or dirt of any kind. To this end a plate 100 of flat metal is laid longitudinally of the car, so that a portion of its width laps over onto the doors on one side of the car, a like plate being laid along the hinged sides of the series of doors on the other side of the car. Along the hinged side of each door is a longitudinal plate 101 of flat metal in contact with the under surface of plate 100. This plate 101 is bent upward slightly along its outer edge and downward along its inner edge, and this downward-curved portion is arranged to coincide with the inner edge of the door and so that when the door is lowered no opening between the plates 100 and 101 will be formed, the curved side of the latter preserving its close contact in all positions of the door, and thereby preventing the entrance into the hinges or into the space between the door and the floor of grain, dust, or dirt.

The swinging edges of the doors are all supported on rollers 105, which not only rotate but are given a bodily movement in a downward-inclined direction toward the hinged side of the doors to permit the opening of the doors. Two of these rollers are positioned under each door, and they are mounted loosely on a bodily-movable shaft 106. There are four of these shafts, each carrying the rollers for one-half of the doors on either side of the car, and as the shafts are preferably square, sleeves or bushings 107, fitting the exterior of the shafts and the interior of the rollers, are interposed between them. The bushings are provided with flanges at each end, as seen at Fig. 14, to confine the roller and are themselves held from all shifting along the shaft in some suitable way, as by upsetting the metal at the corner of the shaft, as seen at 108. The rollers are thus made loose, so that they may revolve in a different direction from that direction in which the shaft may be turned.

The shafts 106 at each end and at each of the three intervening cross-frame members or between each pair of doors are provided with a rimmed gear, the form 109 (shown at Fig. 16) being employed at each of the intervening frame members, the form 110 (shown at Fig. 17) at the outer ends of the shafts, and the form 111 of Fig. 18 at the inner ends of the shafts. These gears are provided with rims upon one or both ends of the teeth in order to give them strength, and unlike the rollers they are fast on the shaft and are applied directly to the shaft without any interposed bushing. Each of them meshes with a corresponding rack 112, the general type of which is shown at Fig. 21, and which are supported in the webbed castings 66, 77, and 91. The webs of these castings are all formed with elongated openings 113, inclined downwardly toward the central line of the car, and these openings are flanged to give them great strength and to adapt them to support the racks, which are preferably made separate and secured in place by entering their depending flanges in longitudinal grooves formed in the bottom of the openings and bolting through the web, as seen at 114 in Figs. 11 and 12, or by offsetting the casting to receive the depending flange of the rack, as seen at Figs. 10 and 23. With this construction it will be seen that any rotary movement given to the shaft 106 will cause it to move bodily through the openings 113 by reason of the engagement of the gears 109, 110, and 111 with their respective racks, the rotation in one direction causing the shaft to traverse the openings in a downward and inward direction, so that the doors may open, and rotation in the other direction causing it to move upward and outward, so that the doors will be closed. By reason of the rotary movement of the shaft, which is caused by manually-operated devices to be described in the next paragraph, the door-supporting rollers 105, which, as already stated, are loosely mounted on the shaft, turn also in the opposite direction from the shaft, their rotation being controlled by their contact with the doors resting upon them and being due to the bodily movement of the shaft instead of its rotation. They permit a gradual opening of the doors and also permit the partial instead of the full opening of them whenever desired, as in ballasting. Of course it will be understood that the racks support the gears, and the latter in turn support the shaft, so that the weight upon the doors can have no deflecting effect on the shaft. The shaft is wholly supported by the gears, except as hereinafter stated, and as a gear is located between each pair of doors it will be seen that the shaft is supported so efficiently as to prevent all deflections.

The gears are assisted in supporting the doors when in their upper or normal position by rollers 115 on the same shaft with the gears and steel blocks 116, supported in the web-castings and forming rests for said rollers. The rollers are freely mounted on the shafts 106, bushings 117, similar to those employed with the door-rollers, being interposed between the shafts and rollers, said bushings having collars upon one side to confine the assisting rollers, as plainly seen at Figs. 10 to 13.

For operating the shaft so that it will move bodily down or up in the openings 113 any suitable mechanism may be employed which is adapted to be actuated by manual power. The construction which I prefer is shown at Figs. 10, 22, and 23. A hand-wheel 120 is mounted on a short shaft 121, which is supported in a bearing 122, secured to the end sill, and in the shell 92, and within the shell is a sprocket-pinion 123, which is mounted on said shaft 121, so as to receive power from said wheel. A large sprocket-wheel 124 is mounted on the end shaft 106 over pinion 123, and a sprocket-chain 125 passes over the wheel 124, under the pinion 123, over an adjustable idler or tightener 126, and under the pinion 127, the idler and said pinion 127 being both located in said shell and the pinion being at the inner end of the shell. With this construction it will be seen that the shaft 106 can be rotated by power applied to the hand-wheel and that the changes in position of the wheel 124 due to the bodily movement of the shaft will not affect the tension of the chain. Locking devices are employed with this mechanism and consist, preferably, of the ratchet-wheel 128 on shaft 121, a pawl 128[a], hinged upon bolt 129, and a gravitating latch 130, pivoted at 131 and adapted to be moved into locking position over the pawl. Preparatory to opening the doors the latch is thrown up and the pawl thrown over, as indicated in broken lines at Fig. 22.

The idler or tightener is supported upon a short pivot 132, the ends of which project through the wings of a U-shaped frame 133, which is vertically movable in the shell 92. A screw 134, inserted in the bottom of the shell, bears upward on the frame 133 and enables me to adjust the latter to any extent necessary to take up the slack of the sprocket-chain. If the pivot 132 projects through the sides of the shell, as shown, slots 135 must be provided therein to accommodate the adjustments of the tightener.

The floor, which is practically unbroken when the doors are closed, is by reason of that fact well adapted to stiffen the car against strains or pressure coming against it edgewise of the floor and also to prevent lateral movement by the headers. The extent of the opening of the doors is limited by a rod 138, extending longitudinally of the car.

In order to enable the removal of the roller-shafts, so as to permit the repair or replacing of the gears or the roller, I secure the gears and roller in some way which permits their being slipped off the shaft with but little trouble and provide an opening 136 in the end sill opposite the lowest position of the shaft, through which the shaft may be removed endwise. I have already described one way of confining the gears and rollers in place which permits their being removed with trifling labor. The opening 136 is preferably kept filled by a screw or plug 137. This feature enables the removal of the shaft and the replacing of worn or broken gears and rollers without taking out a single bolt from the headers or bolsters, the driven sprocket-wheel being also readily removable from the shaft.

The cross-frame members are increased in number above the number employed heretofore and to such an extent as enables the placing of one of them between each pair of the doors, and by providing all of them with the webbed castings at their ends I am enabled to form in them the inclined ways, through which the door-supporting shafts move, and at the same time to give those shafts support in each cross member, and thus prevent any deflection of the shafts by the load upon the doors.

It will be noticed that the braces 42 form triangles with their bases resting on the bolsters and needle-beams and that the intermediate headers are suspended on the apices of the triangles. It will also be noticed that the stakes are firmly bolted to the side walls and also to the bolsters and headers, so that the braced side walls through the stakes are well adapted to assist the cross-frame members in sustaining the load. At each of the headers, except the bolsters, the tie-rods 83 are employed, and as they pass through the flanges of the stakes and also through the outside castings 76 it will be seen that any tendency to spread under the pressure of the load will be effectually resisted.

In the headers shown at Fig. 9 a cast-frame 140 is inserted between the intermediate and center sills, and a similar frame 141 is inserted between the center sills. Both these frames are stiffened by interior ribs, as shown, and they serve to keep the sills in their proper relative positions, as well as to make them mutually helpful.

Metal straps 142 are applied to the planking 44 outside the stakes to give the bolts attaching the planking a better hold. The ends of the car have similar planking 44, bolted to channel-iron stakes 143, secured to the end sills, and with similar straps 142 outside the stakes. Angle-irons 145 are also applied preferably to the inside of the corners, as shown. A bevel-faced base-strip 146 is arranged around the car at the junction of the floor with the sides and ends.

I claim—

1. The car having all its longitudinal sills located centrally and having a level and unobstructed floor above the plane of the sills, extending from end to end and from side to side of the car, said floor embodying two series of outwardly-opening doors hinged to the outside of the sills.

2. The car all whose longitudinal sills are located centrally, and provided with a level unobstructed floor above the sills, extending from end to end, and side to side of the car, such floor embodying outwardly-opening doors hinged outside the line of the sills.

3. The car having all its longitudinal sills located centrally, and having a series of dump-doors in its floor extending from end to end of the car and hinged to the outside of the sills.

4. The car having all its longitudinal sills located centrally, and also having a level floor from end to end, the side portions of said floor being formed by doors hinged to the outside of the sills and opening at their outer edges.

5. The car having all its longitudinal sills located centrally and also having a level floor from end to end, the side portions of said floor embodying doors hinged to the sills and opening at their outer edges and located over the trucks.

6. The car having its longitudinal sills located centrally and also having a level floor extending from end to end of the car and outwardly-opening dump-doors in said floor, said doors being provided with supports adapted to control the extent of their opening, and to permit only a partial opening when that is desired.

7. The car whose longitudinal underframing consists of center and intermediate sills, and whose side walls are braced by heavy diagonal braces extending from stake to stake, and entered at their upper ends under bent-over portions of the stakes, substantially as specified.

8. The car having stakes 46 with bent-over portions 45, and diagonal braces entered under said bent-over portions, substantially as specified.

9. The car having only centrally-located sills, a level and unobstructed floor throughout, and a superstructure provided with a base-strip, said floor embodying a series of outwardly-opening doors located outside the sills and extending under said base-strip.

10. The combination with the center and intermediate sills, of a bolster consisting of a top bar with its ends bent down, a bottom bar, outside casting 58, the webbed casting 66, and the casting 68, substantially as specified.

11. The combination with the center and intermediate sills, of a bolster-bar, outside casting 58, webbed casting 66, and the stakes passing down through the forked ends of the top bar and the webbed casting, substantially as specified.

12. The car having its headers or cross-frame members provided with webbed castings which extend from the intermediate sills outward to the stakes and support the latter, substantially as specified.

13. The car having headers embodying webbed castings extending outward from the intermediate sills and beams below said castings extending outward from the center sills, substantially as specified.

14. The header consisting of the webbed casting 77, the beam 75 and the outside end casting, substantially as specified.

15. The header consisting of the webbed casting 77, the beam 75, the outside end casting, and the shell-casting 83, substantially as specified.

16. The car whose longitudinal load-supporting members consist solely of the center sills, the intermediate sills and the braced side walls of the box, and provided with dump-doors in its floor along its side walls opening toward the outside of the track, substantially as specified.

17. The combination with the dump-door of a car, of means for supporting the swinging edge of the door when closed, consisting of rollers movable downward back from said edge, substantially as specified.

18. The combination with the dump-door of a car, of means for supporting the swinging edge of the door when closed, consisting of rollers movable downward back from said edge, and a shaft supporting said rollers, substantially as specified.

19. The combination with the dump-door of a car, of a shaft and rollers thereon for supporting the swinging edge of the door, said shaft being movable bodily downward and back from said edge, substantially as specified.

20. The combination with the dump-door of a car, of a shaft and rollers thereon for supporting the swinging edge of the door, said shaft being movable bodily downward and back from said edge, and means for so moving said rollers, substantially as specified.

21. The combination with the dump-door of a car, of a shaft and rollers thereon for supporting the swinging edge of the door, said shaft being movable bodily downward and back from said edge, and means for moving said shaft, substantially as specified.

22. The combination with the dump-door of a car, consisting of rollers located below the door and movable from their normal positions in which they hold the door closed, and acting to support the door in all of its positions, substantially as specified.

23. The combination with the dump-door of a car, of a shaft and rollers thereon for supporting the swinging edge of the door, said shaft being movable bodily downward and backward and being also rotatable, substantially as specified.

24. The combination with the dump-door of a car, of a shaft and rollers thereon for supporting the swinging edge of the door, said shaft being movable bodily downward and backward and being also rotatable, and means for rotating the shaft, substantially as specified.

25. The combination with the dump-door of a car, of a shaft and rollers thereon for supporting the swinging edge of the door, said shaft being movable bodily downward and backward and being also rotatable, means for rotating the shaft, and racks and pinions for moving the shaft bodily, substantially as specified.

26. The combination with the dump-door of a car, of a shaft and rollers thereon for supporting the swinging edge of the door, said shaft being movable bodily downward and backward and being also rotatable, and the rollers being loosely mounted on the shaft, substantially as specified.

27. The combination with the dump-door of a car, of a shaft and rollers thereon for supporting the swinging edge of the door, said shaft being movable bodily downward and backward and being also rotatable, means for rotating the shaft, stationary racks supported in the cross-framing, and pinions on the shaft, whereby the rotation of the shaft causes its bodily movement, substantially as specified.

28. The combination with the cross-frame members of the car and a longitudinal series of dump-doors, of a shaft passing through said members, and carrying loose rollers for supporting the doors, inclined racks in said members meshing with pinions on the shaft, and means for rotating the shaft and giving it a bodily movement to open the doors, substantially as specified.

29. The car, the underframing whereof consists of center and intermediate sills, end sills, bolsters, needle-beams and headers, the latter located between the bolsters and needle-beams, substantially as specified.

30. The car having a longitudinal series of dump-doors along each of its sides, and headers or cross-frames extending between the doors of each series and affording them lateral support.

31. The car having a longitudinal series of dump-doors along its sides, headers or cross-frame members between adjacent doors, and a shaft extending through and sustained by said headers and supporting the doors, substantially as specified.

32. The car having a longitudinal series of dump-doors along its sides, headers or cross-frame members between adjacent doors, and a shaft extending through and sustained by said headers and supporting the doors, said shaft being also supported at its outer end from the end sill, substantially as specified.

33. The car having its bolsters and headers all provided with cast-metal ends having formed in them inclined ways for the door-supporting shafts, substantially as specified.

34. The car having its bolsters and headers all provided with cast-metal ends having inclined openings and racks for the door-supporting shafts and their operating-pinions, substantially as specified.

35. The car wherein are combined the dump-doors, the cross members between the doors having cast-metal ends with inclined openings and racks, and the door-supporting shafts moving through said openings and having pinions meshing with the racks, substantially as specified.

36. The car wherein are combined the dump-doors, the cross members between the doors having cast-metal ends with inclined openings and racks, the end sill having a casting also provided with an inclined opening and rack, and the door-supporting shaft moving through said openings and having pinions meshing with the racks, substantially as specified.

37. The combination with the end sill and bodily-movable door-supporting shaft, of the casting 91 applied to said sill and provided with an opening in which the end of the shaft may be supported and be moved, substantially as specified.

38. The car having an endwise-movable door-supporting shaft located wholly inside the end sill, in combination with such end sill having an opening therethrough permitting the removal of the shaft when in one of its positions, substantially as specified.

39. The door-supporting shaft having the rollers and pinions carried by it readily releasable so they may be slipped off, and itself removable endwise from the car, in combination with the frame members through which the shaft passes, substantially as specified.

40. The combination with the doors and the cross-frame members having inclined openings therethrough, of a bodily-movable and rotating door-supporting shaft sustained in said openings and removable endwise therefrom, substantially as specified.

41. The car having its side walls braced by braces 42 whose lower ends are supported upon the bolsters and needle-beams, substantially as specified.

42. The car having its side walls braced by braces 42 supported at their lower ends upon bolsters and needle-beams, and themselves supporting the stakes of the intermediate headers, substantially as specified.

43. In a car of the class described, the combination of a supporting-frame, a drop-bottom formed of a plurality of swinging doors secured to the supporting-frame and rolling mechanism adapted to contact such doors to close and hold the same in closed position, substantially as described.

44. In a car of the class described, the combination of a supporting-frame portion, a drop-bottom portion therefor formed of a plurality of swinging sections pivotally secured together at each side of a longitudinal center of the car, a reciprocating bar extending longitudinally of the car, and movable transversely thereof in engagement with each swinging section, and means for reciprocating said bar to open and close the swinging sections, substantially as described.

45. In a car of the class described, the combination of a supporting-framework provided with a rock bottom formed of a plurality of swinging sections pivotally secured thereto, a reciprocating bar having a bearing portion in the supporting-framework of the car and contacting the under side of each swinging section, and means for reciprocating said bar to open and close the swinging sections, substantially as described.

46. In a car of the class described, the combination of a supporting bottom frame, a drop-floor section hinged in said frame, means supporting said section and contacting with its under surface and movable back and forth between its hinged edge and its swinging edge, and regulating the opening by the extent of its movement, means for operating the said supporting means, and means for arresting said operating means at an intermediate position.

47. In a car of the class described, the combination of a supporting bottom frame, a drop-floor section hinged in said frame, means supporting the swinging side of the section and contacting with its under surface and movable from the hinged side toward the swinging side to close the section and regulating the door by the position to which the supporting means are moved, and means for operating said supporting means.

48. In a car of the class described, the combination of a supporting bottom frame, a drop-floor section hinged to a longitudinal member of the frame, means supporting said section and contacting with its under surface and movable toward and from said longitudinal frame member in opening and closing said section, said means being sustained in the cross-framing of the bottom, and means for operating said supporting means.

49. In a car of the class described, the combination of a supporting bottom frame, a drop-floor section hinged to a central longitudinal member of the frame and opening at its outer edge, means supporting said section and contacting with its under surface and movable outward from said frame member inclosing the section, said means being sustained in the cross-framing in the bottom, and means for operating said supporting means.

50. The combination with the hinged dumping-door of a flat-bottom car, of means for supporting the door in its closed and open positions, such means consisting of a rigid bar located under and extending lengthwise across the door and movable toward the opening side of the door to close the same and toward the hinged side to open it, supports for said bar at each end of the door, and means for controlling said bar.

51. The combination with a hinged dumping-door of a flat-bottom car, of means for supporting the door in its closed and open positions, such means consisting of a rigid bar located under and extending lengthwise across the door and movable toward the opening side of the door to close the same and toward the hinged side to open it, supports for said bar at each end of the door, and means for controlling said bar adapted to hold it rigidly in intermediate position.

52. The combination with a hinged dumping-door of a flat-bottom car, of means for supporting the door in its closed and open positions, such means consisting of a rigid bar having a bearing contact with the under side of the door and extending lengthwise across it, and movable toward the hinged side of the door to open it, and toward the opening side to close it, supports for said bar at each end of the door, and means for controlling the bar.

53. The combination with a hinged dumping-door of a flat-bottom car, of means for supporting the door in its closed and open positions, such means consisting of a rigid bar extending lengthwise across the door and having a bearing contact with it at each end, said bar being movable toward the opening side of the door to close it and toward the hinged side to open it, supports for said bar at each end of the door, and means for controlling the bar.

54. The combination with a hinged dumping-floor section, of a rigid bar extending across the section and movable transversely of the section and always in bearing contact therewith, means for controlling said bar in its different positions, and supports for the bar located outside the section.

55. The combination with a hinged dumping-floor section, of a rigid bar extending across the section and movable transversely of the section and always in bearing contact therewith, means for controlling said bar in its different positions, and ways outside the section on which said bar rests and travels.

56. In a dump-car, the combination of a car-frame, a dumping-door pivotally mounted in such car-frame movable to open and closed position, a shaft reciprocatingly mounted beneath and supporting such door in both open and closed positions, and means for supporting the shaft and thereby the dumping-door in both open and closed positions.

57. In a dump-car, the combination of a car-frame, dumping-doors pivotally mounted in such car-frame movable to open and closed positions, a shaft reciprocatingly mounted beneath and supporting such doors, and supporting mechanism having upwardly and outwardly inclined supporting-surface portions upon which such shaft is mounted and provided with looped portions at the lower end of such inclined portions for limiting the movement of the shaft and thereby the dumping-doors.

58. In a car, the combination of a car-frame having longitudinal sill mechanism, end sills and transverse beams between such end sills, a dumping-door secured to the car-frame movable to open and closed positions, and dumping-door-supporting mechanism supported by such transverse beams said supporting mechanism being movable longitudinally of the door.

59. In a car, the combination of a car-frame having longitudinal sill mechanism and transverse beams mounted between the ends of the car-frame, dumping-doors secured to such car-frame movable to open and closed positions, and door-operating mechanism mounted in such transverse beams and connected with the dumping-doors said supporting mechanism being movable longitudinally of the door.

60. In a car, the combination of a car-frame having transverse beams, dumping-doors secured to such car-frame movable to open and closed positions, and door supporting and operating shaft mechanism beneath the dumping-doors and supported by the transverse beams said supporting mechanism being movable longitudinally of the door.

61. In a car, the combination of a car-frame having transverse beams mounted between the ends of the car, dumping-doors secured to the car-frame movable to open and closed positions, shaft mechanism mounted in such transverse beams beneath the dumping-doors and operatively connected therewith for opening and closing the doors and supporting them in closed position, and means for operating such shaft mechanism said shaft mechanism being movable longitudinally of the door.

62. In a car, the combination of a car-frame having longitudinal sill mechanism end sills and transverse beams secured to such longitudinal sills and extending transversely of the car, dumping-doors mounted in the car-frame on opposite sides of its longitudinal center movable to open and closed positions and having their inner edges hinged to the car-frame forming flat-bottom portions for the car when in closed position, and door operating and supporting shafts mounted in the transverse beams beneath the dumping-doors and operatively connected therewith said shafts being movable longitudinally of the door.

63. In a car, the combination of a car-frame having transverse beams between the ends thereof, dumping-doors secured to such car-frame movable to open and closed positions, and shafts extending longitudinally of the car supported by such transverse members of the car-frame and in operative engagement with the swinging sides of the dumping-doors outside their longitudinal centers for supporting them.

WILLIAM A. CASWELL.

Witnesses:

NORMAN A. STREET,

W. T. JONES.